United States Patent
Corcoran et al.

(10) Patent No.: US 11,863,556 B2
(45) Date of Patent: *Jan. 2, 2024

(54) CONFIGURING ACCESS FOR INTERNET-OF-THINGS AND LIMITED USER INTERFACE DEVICES

(71) Applicant: FotoNation Limited, Galway (IE)

(72) Inventors: Peter Corcoran, Galway (IE); Ilariu Raducan, Galway (IE); Petronel Bigioi, Galway (IE)

(73) Assignee: FotoNation Limited

( * ) Notice: Subject to any disclaimer, the term of this patent is extended or adjusted under 35 U.S.C. 154(b) by 29 days.

This patent is subject to a terminal disclaimer.

(21) Appl. No.: 17/243,236

(22) Filed: Apr. 28, 2021

(65) Prior Publication Data

US 2021/0328987 A1 Oct. 21, 2021

Related U.S. Application Data

(63) Continuation of application No. 16/107,910, filed on Aug. 21, 2018, now Pat. No. 10,999,275, which is a (Continued)

(51) Int. Cl.
*H04L 29/06* (2006.01)
*H04W 12/06* (2021.01)
(Continued)

(52) U.S. Cl.
CPC ........ *H04L 63/0876* (2013.01); *H04L 9/3218* (2013.01); *H04L 63/18* (2013.01); (Continued)

(58) Field of Classification Search
CPC ... H04L 63/0876; H04L 9/3218; H04L 63/18; H04L 63/0861; H04L 2209/76; (Continued)

(56) References Cited

U.S. PATENT DOCUMENTS 8,934,383 B1 * 1/2015 McConkey ......... H04L 65/1045
                                                            370/338
10,448,104 B1 * 10/2019 Pontual ............... H04N 21/262
(Continued)

FOREIGN PATENT DOCUMENTS

WO   WO2014031542   2/2014
WO   WO2014131001   8/2014
(Continued)

OTHER PUBLICATIONS

Office Action for U.S. Appl. No. 16/107,910, dated May 26, 2020, Corcoran, "Method for Configuring Access for a Limited User Interface (UI) Device ", 28 Pages.
(Continued)

*Primary Examiner* — Quazi Farooqui
(74) *Attorney, Agent, or Firm* — Lerner David LLP

(57) ABSTRACT

A method operable by a computing device for configuring access for a limited user interface (UI) device to a network service via a local network access point is disclosed. The method comprises the steps of: obtaining from the limited UI device a device identifier via a first out-of-band channel. The device identifier is provided to the network service via a secure network link. A zero knowledge proof (ZKP) challenge is received from the network service. Configuration information is provided to the limited-UI device via a second out-of-band channel, the configuration information including information sufficient to enable the limited-UI device to connect to the local network access point. The ZKP challenge is provided to the limited-UI device via the second out-of-band channel. A secure channel key is received from the network service indicating a successful response from the limited-UI device to the ZKP challenge; and provided to the limited-UI device enabling the limited-UI device to access the network service.

20 Claims, 7 Drawing Sheets

Related U.S. Application Data continuation of application No. 14/936,457, filed on Nov. 9, 2015, now Pat. No. 10,057,261.

(51) Int. Cl.

| | | |
|---|---|---|
| *H04L 9/32* | (2006.01) | |
| *H04W 4/80* | (2018.01) | |
| *H04W 76/10* | (2018.01) | |
| *H04W 12/50* | (2021.01) | |
| *H04L 9/40* | (2022.01) | |
| *H04W 84/12* | (2009.01) | |
| *H04W 4/70* | (2018.01) | |
| *H04W 12/65* | (2021.01) | |
| *H04W 12/77* | (2021.01) | |
| *H04W 12/04* | (2021.01) | |

(52) U.S. Cl.
CPC .............. *H04W 4/80* (2018.02); *H04W 12/06* (2013.01); *H04W 12/50* (2021.01); *H04W 76/10* (2018.02); H04L 63/0861 (2013.01); H04L 2209/76 (2013.01); H04L 2209/805 (2013.01); *H04W 4/70* (2018.02); *H04W 12/04* (2013.01); *H04W 12/65* (2021.01); *H04W 12/77* (2021.01); *H04W 84/12* (2013.01)

(58) Field of Classification Search
CPC ..... H04L 2209/805; H04L 29/06; H04L 9/32; H04W 4/80; H04W 12/06; H04W 12/50; H04W 76/10; H04W 4/70; H04W 12/04; H04W 12/65; H04W 12/77; H04W 84/12
See application file for complete search history.

(56) References Cited

U.S. PATENT DOCUMENTS

| | | | |
|---|---|---|---|
| 2004/0111615 A1 | 6/2004 | Nyang et al. | |
| 2004/0196963 A1* | 10/2004 | Appelman | H04M 3/02 379/88.12 |
| 2005/0246771 A1* | 11/2005 | Hunt | H04L 9/3273 726/18 |
| 2006/0103531 A1 | 5/2006 | Chevreau et al. | |
| 2008/0091618 A1* | 4/2008 | Obrea | G06F 21/31 705/76 |
| 2010/0290618 A1 | 11/2010 | Slawomir et al. | |
| 2012/0060028 A1 | 3/2012 | Furukawa | |
| 2012/0284195 A1* | 11/2012 | McMillen | G06Q 20/3223 705/41 |
| 2013/0198813 A1* | 8/2013 | Van Roermund | G06F 21/35 726/4 |
| 2014/0137194 A1* | 5/2014 | Nagasaki | G06F 3/1292 726/3 |
| 2014/0157373 A1 | 6/2014 | Tanaka et al. | |
| 2014/0189808 A1* | 7/2014 | Mahaffey | G06F 21/31 726/4 |
| 2014/0337957 A1* | 11/2014 | Feekes | H04L 63/0853 726/9 |
| 2015/0007273 A1* | 1/2015 | Lin | H04L 47/10 726/4 |
| 2015/0271667 A1* | 9/2015 | Bernsen | H04L 9/3215 713/171 |
| 2016/0205078 A1* | 7/2016 | James | H04L 9/006 713/171 |
| 2016/0294828 A1 | 10/2016 | Zakaria | |
| 2016/0323689 A1* | 11/2016 | Goluboff | H04L 63/0823 |
| 2016/0330199 A1* | 11/2016 | Weiner | H04L 63/0853 |
| 2016/0359965 A1 | 12/2016 | Murphy et al. | |
| 2016/0364223 A1* | 12/2016 | Vandikas | G06Q 20/3825 |
| 2016/0381030 A1* | 12/2016 | Chillappa | H04W 4/38 726/11 |
| 2017/0033925 A1* | 2/2017 | DeNeut | H04L 9/0819 |
| 2017/0126402 A1* | 5/2017 | Medvinsky | H04L 9/0866 |
| 2018/0359251 A1 | 12/2018 | Corcoran et al. | |

FOREIGN PATENT DOCUMENTS

| | | |
|---|---|---|
| WO | WO2014131015 | 8/2014 |
| WO | WO2014131029 | 8/2014 |
| WO | WO2014131035 | 8/2014 |
| WO | WO2014131038 | 8/2014 |
| WO | WO2014163877 | 10/2014 |
| WO | WO2015017268 | 2/2015 |

OTHER PUBLICATIONS

Office Action for U.S. Appl. No. 16/107,910, dated Dec. 26, 2019, Corcoran, "Method for Configuring Access for a Limited User Interface (UI) Device", 23 pages.

* cited by examiner

CONFIGURING ACCESS FOR INTERNET-OF-THINGS AND LIMITED USER INTERFACE DEVICES

RELATED APPLICATIONS

This application is a continuation of and claims priority to co-pending U.S. patent application Ser. No. 16/107,910, filed on Aug. 21, 2018, and entitled "Method for Configuring Access for a Limited User Interface (UI) Device," which is continuation of and claims priority to U.S. Pat. No. 10,057,261, filed on Nov. 9, 2015, and entitled "Method for Configuring Access for a Limited User Interface (UI) Device," each of which is incorporated by reference herein in its entirety for all purposes.

FIELD

The present invention relates to a method for configuring access for a limited user interface (UI) device to a network service via a local network access point.

BACKGROUND

A Wi-Fi client device, for example, as defined by IEEE 802.11, goes through a setup process to associate/connect with a Wi-Fi Access Point (AP). The setup process typically includes the client device scanning for AP's within range, displaying AP's found within range of the client device on a display interface, receiving user selection of a displayed AP via an input interface, receiving/transmitting a network key or password (typically required by the AP) entered by the user via the input interface, and establishing a connection to the AP. If the network key is incorrect, an error message is displayed to the user.

The Internet of Things (IoT) describes a wide range of emerging consumer devices that require network integration as part of their underlying functionality. For most such devices they must connect to a network, and the normal use case involves connecting to a local network AP.

Many IoT devices will feature at least a rudimentary user interface (UI) comprising either a touch-screen; or keypad and screen, enabling a password to be entered to establish a secure wireless link with the local network. Additional device configuration may then be effected via the same user interface, including establishing a link to a local IoT supervisor or to a remote IoT server. Again, user entry of passwords and keycodes is prone to error and may be unacceptable to many consumers.

At the same time, some limited-UI IoT devices, for example, web-cameras, security lights or sensors may lack one or both of an input interface and display interface and so do not readily provide a suitable user interface for such configuration.

Current attempts to simplify Wi-Fi setup, such as Wi-Fi Protected Setup (WPS), either require PIN to be entered, or pressing buttons on the client device and AP at the same time, or both, while others send information to the client device without encryption, exposing the Wi-Fi network to snooping devices. Some IoT devices such as a simplicam web-camera from ArcSoft obtain required configuration information for connecting to a local AP using out-of-band channels, such as by imaging a QR code provided by an authorised user's smartphone; while others such as the HeeLight smart bulb obtain their control information through a coded/modulated sound burst provided by an authorised user's smartphone.

However, it is not alone sufficient for today's IoT devices to join a local network, they may also need to join some form of network service or, as becomes more common, an external Internet or Cloud service. There has been significant growth in such services to manage local network devices such as those in the home. Thus, once they are connected to the local network, individual devices need to access external URLs on the Internet via their local AP.

Cyber-security is key for success of IoT. Consumers are already concerned with the security of their devices and major vendors have moved to securely encrypt all major device communication from mobile devices. Thus integrated e-mail services such as gmail and iOS-mail now provide end-to-end secured communications including providing two-factor authentication.

Some manufacturers even provide an integrated security keychain across all of a consumer's registered devices. Thus, a user knows if a new device is added or rejoins their private cluster of devices. It is also possible, for this group of secured devices, to enable the sharing of services, content and application functionality within a group of users. This approach, known commercially as family sharing, is useful as it allows shared access to services, but also allows granularity at both the user and device levels.

To ensure robust security and centralized authentication and service control, these services are cloud based and are typically linked to a payment mechanism such as a credit card. Such services will hereafter be referred to as Keychained Cloud Services (KCS). Today, these offer best practice in consumer security for mobile device services.

The challenge for IoT devices, is that each device is vulnerable until it becomes configured. Even if it will eventually establish a secure, encrypted communication with the cloud service, the initial configuration steps can be typically unsecured, as can the initial establishing of a TCP/IP link with the local network access point.

WO2014/163877 teaches shifting the network setup functionality from a limited-UI device to a full-feature device. At first power up, when a reset button is pressed, or whenever the limited-UI client device cannot connect to the network, the limited-UI device enters a network setup mode that allows a full-feature device to connect to the limited-UI device. For example, if the network is Wi-Fi, the limited-UI device becomes an AP for the full-feature device or the limited-UI device goes into Ad-Hoc mode.

WO2014/131038 teaches enabling communication among one or more IoT device groups. In particular, various heterogeneous IoT devices that may need to interact with one another in different ways may be organized into IoT device groups to support efficient interaction among the IoT devices.

WO2014/131029 teaches enabling context aware actions among heterogeneous IoT devices including receiving, at an IoT device, data representing a context of each of a first set of IoT devices in an IoT network, receiving, at the IoT device, data representing a current state of each of a second set of IoT devices in the IoT network, and determining, by the IoT device, an action to perform at a target IoT based on the received data representing the context of each of the first set of IoT devices and the received data representing the current state of each of the second set of IoT devices.

WO2014/131035 teaches controlling of IoT devices based on detecting a device and obtaining control information and associated rules for controlling the device. The control functions available to a smart controller can vary based on the condition of the various rules and/or the interaction of the various devices detected.

WO2014/131015 teaches collaborative intelligence and decision making in an IoT device group. In particular, various IoT devices in the group may be interdependent, whereby a decision that one IoT device plans may impact other IoT devices in the group. Accordingly, in response to an IoT device planning a certain decision (e.g., to transition state or initiate another action), the IoT devices in the group may collaborate using distributed intelligence prior to taking action on the planned decision. For example, a recommendation request message may be sent to other IoT devices in the group, which may then analyze relationships within the IoT device group to assess potential impacts associated with the planned decision and respond to approve or disapprove the planned decision. Based on the responses received from the other IoT devices, the IoT device may then appropriately determine whether to take action on the planned decision.

WO2014/131001 teaches determining an association among IoT devices includes receiving, at a first IoT device, an identifier of a second IoT device, obtaining, by the first IoT device, a schema of the second IoT device based on the identifier of the second IoT device, and determining, by the first IoT device, whether or not there is an association between the first IoT device and the second IoT device based on a schema of the first IoT device and the schema of the second IoT device, wherein the schema of the first IoT device comprises schema elements and corresponding values of the first IoT device and the schema of the second IoT device comprises schema elements and corresponding values of the second IoT device.

WO2015/017268 teaches establishing a connection between first and second IoT devices. After a determination is made to execute a proximity detection procedure, the second IoT device outputs an audio emission and a data packet at substantially the same time. The first IoT device detects the audio emission via a microphone and receives the data packet. The first IoT device uses correlation information to correlate the detected audio emission with the data packet, whereby the correlation information is contained in the detected audio emission, the data packet or both. The first IoT device uses the correlation between the detected audio emission and the data packet to calculate a distance estimate between the first and second IoT devices.

Referring to FIG. 1, WO2014/031542 teaches configuring a new enrollee device (140) for a communication network (120) including a network node (230) where an electronic device (110) obtains (250) a device password associated with the new enrollee device. The device password is provided (154) to a network registrar (130) to cause the network registrar to configure the new enrollee device for the communication network. The network registrar performs an enrollment process (226) based upon the device password and, optionally, provides feedback (160) to the electronic device to indicate whether or not the new enrollee device was successfully enrolled (i.e. added) to the communication network.

SUMMARY

According to a first aspect of the present invention there is provided a method according to the claims.

According to a second aspect, there is provided a method according to the claims.

In further aspects, there are provided computing devices and computer program products which when executed on a computing device are arranged to perform the above methods.

Note that because of the use of a ZKP protocol and a secure ephemeral link between a limited-UI device and a full feature device, the limited-UI device is able to connect to its service provider using the full feature device to establish its credentials with the service, but without either: revealing any user credentials or configuration information for the local AP to the cloud service; or exposing these credentials or configuration information locally while establishing the connection to the cloud service.

DETAILED DESCRIPTION

Figure 1:
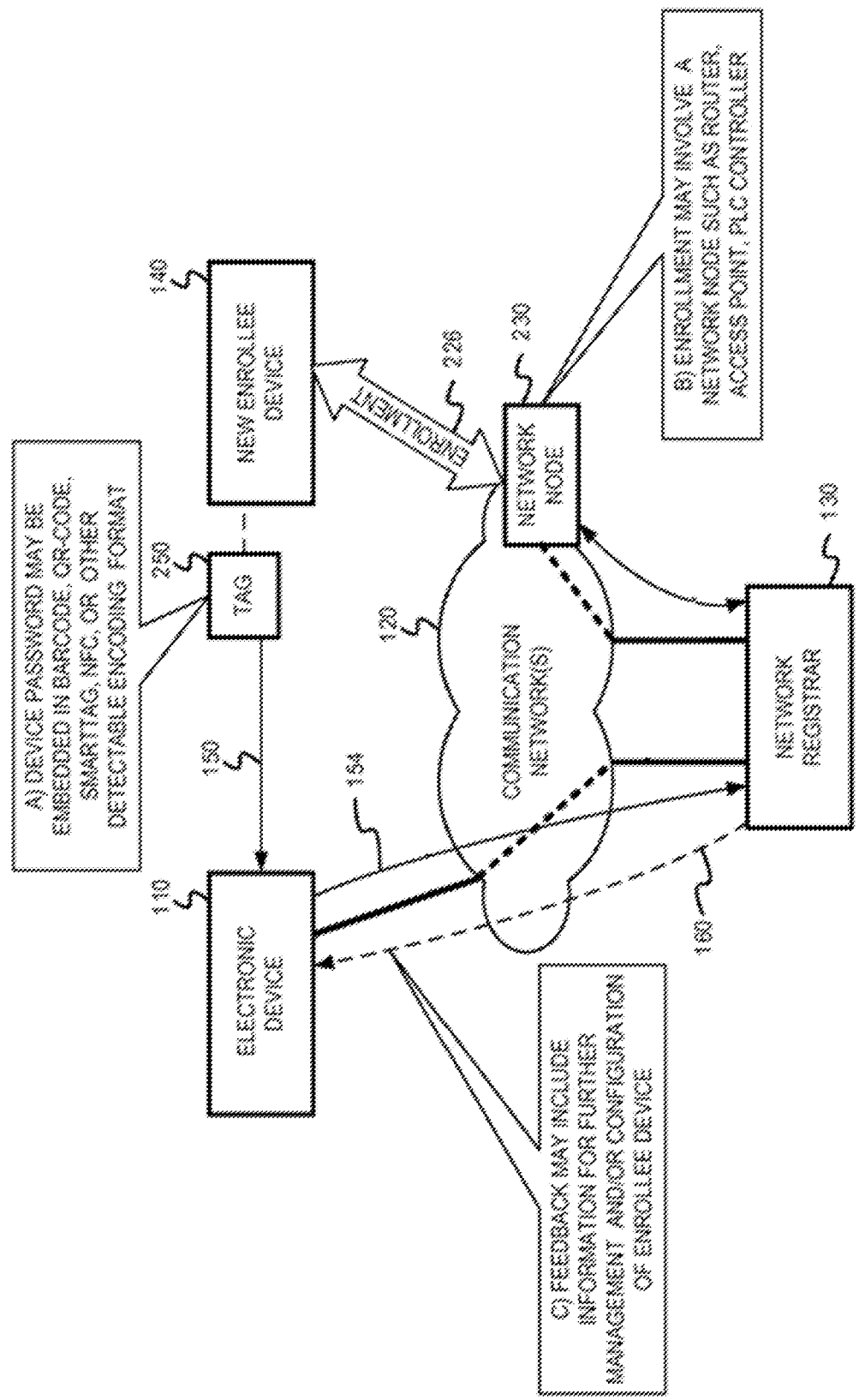
FIG. 1 illustrates a prior art approach to configuring an IoT type device.
Figure 2A:
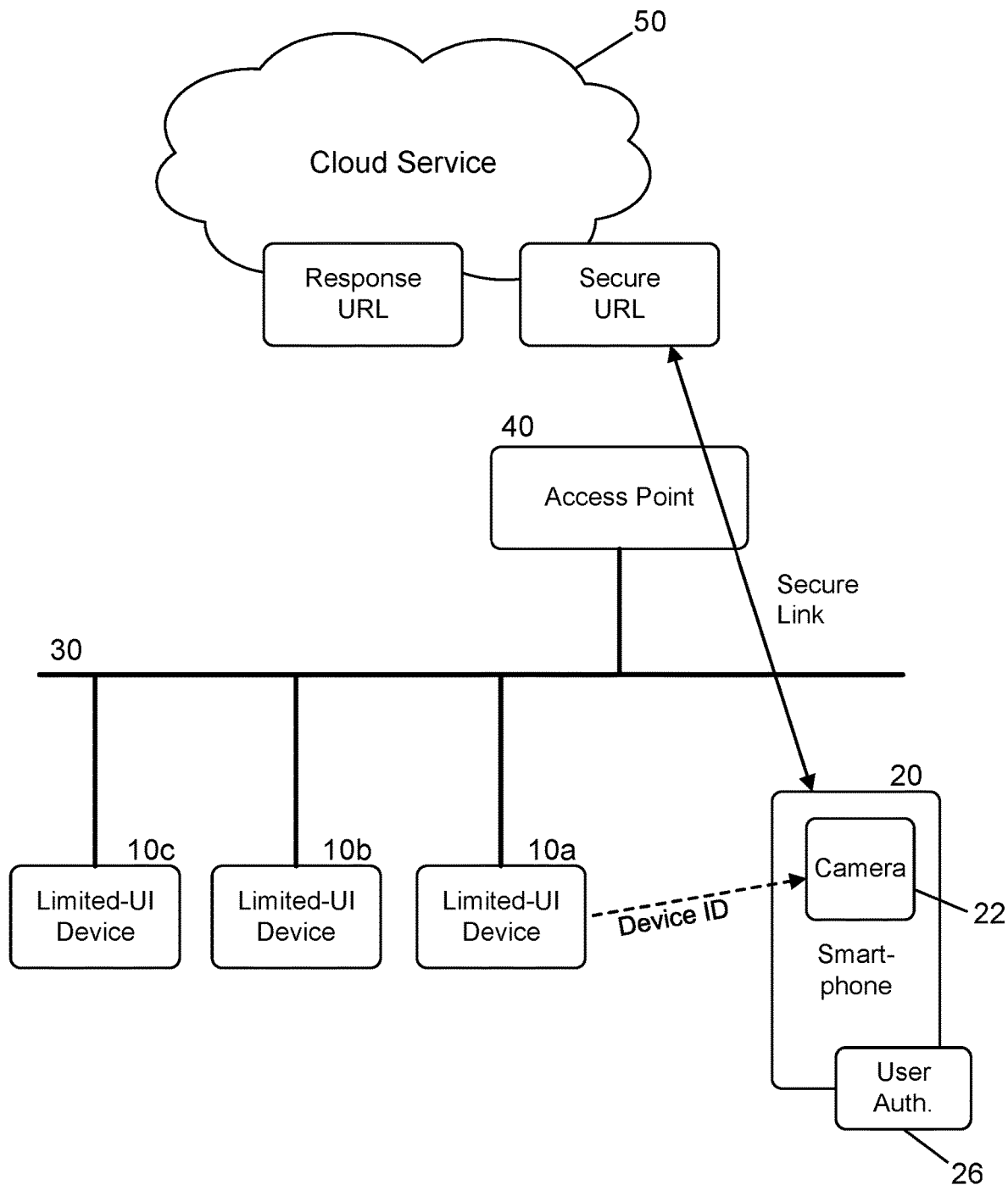
FIGS. 2(a) to 2(f) illustrate a method of configuring an IoT type device according to an embodiment of the present invention.

Referring now to FIG. 2(a), embodiments of the invention make use of a secured and authenticated full-feature device 20 to configure, secure and authenticate an IoT device 10a,10b,10c, in particular an IoT device with a limited-UI. Examples of full-feature device include a smartphone, tablet computer, laptop computer or indeed any computing device having the required UI and which can be brought into proximity with an IoT device to be configured. The required UI can comprise a display and keypad or touchscreen (not shown), camera 22 (for example, for imaging device tags or light signals), microphone (not shown, for detecting coded sound), speaker 24 (for example, for emitting coded sound) and/or Bluetooth, near-field communication (NFC) tag or radio frequency identifier (RFID) antennae (not shown).

By authenticated, we mean that the device 20 has obtained and/or holds at least sufficient credentials 26 to establish a connection to a network service 50 across a secure link via a local network 30 comprising either a wired or wireless LAN or combination thereof and including a local access point 40. Where the device 20 is a smartphone, it may already have application software, for example, an app, installed enabling it to connect to the network service 50 which is to supervise the IoT devices 10a . . . 10c on the local network 30. The configuration information for the local network, application software and any user credentials required to operate the application and establish the secure link can be regarded as part of the credentials 26.

The configuration process for the limited-UI device 10a is as follows:

A user first obtains with the smartphone 20, an identifier (ID) for the limited-UI device 10a using any one of a variety of out-of-band methods, such as scanning a visual tag with its camera 22, detecting an audio signal with a microphone (not shown), detecting a light signal emitted by the device 10a (again with the camera 22), detecting the device ID via a NFC tag, RFID tag, or other ways in which the new limited-UI device 10a may communicate the device ID with the electronic device 20. It is noted that while Bluetooth radio signal or Wi-Fi Direct handshake could also be used by the electronic device 20 to obtain the ID from the new enrollee device 10a, such mechanisms may not be regarded as sufficiently secure for some implementations as they may be regarded as prone to wireless signal eavesdropping.

In one example, the limited-UI device 10a is a smart light bulb. The smart light bulb can have a visual tag printed on it (or on the packaging, or insert in the packaging), such as a barcode, matrix code, two-dimensional code. A common example of a barcode that may be used for a new enrollee device may be a Quick Response (QR) Code®. The full-UI device 20 may detect the QR Code (or similar visual tag) using the camera 22 and obtain the device ID by decoding the QR Code.

If the device 10a is the first device for the network service 50 being added to the local network 30, the device 20 may not have the required application software installed. However, imaging a QR code may provide the device 20 with sufficient information to obtain and install this application software before proceeding. On the other hand, if the application software is installed on the device 20, it may be manually instantiated by the user before imaging the QR code (or acquiring the device ID otherwise); or it may be automatically instantiated in response to imaging the QR code.

The device ID may be a manufacturer-configured model number or device key for the new enrollee device. In one embodiment, the ID is a combination of a device model number and a production batch number. The device ID is typically not unique to a single device, but instead the device may belong to a production batch that shares a common manufacturing process and device firmware. In addition to the device ID, other information may also be encoded on the QR Code, such as a management URL, name and/or model of the new enrollee device 10a, or other information relevant to the configuration, management, or utilization of the new enrollee device 10a.

The second stage involves the smartphone application software communicating the device ID to the network service 50, for example, a cloud based service via its secure link to the service. As explained, the service 50 can be accessed via application software installed on the smartphone that establishes a secure connection to the cloud service 50 and is authenticated by the smartphone device. As an example, the device could be an iPhone or similar Android device and the authentication could be provided, using a password, smartcard or any biometric including fingerprint authentication capability of the device. Thus, the smartphone can be part of a Key-chained Cloud Service (KCS) and the cloud service associates the new IoT device 10a with the same user and keychain.

Note that communication between the device 20 and the cloud service 50 secured using HTTPS or similar by default. Thus, the smartphone communications with the cloud service would not be accessible by any compromised devices on the local network 30.

Figure 2B:
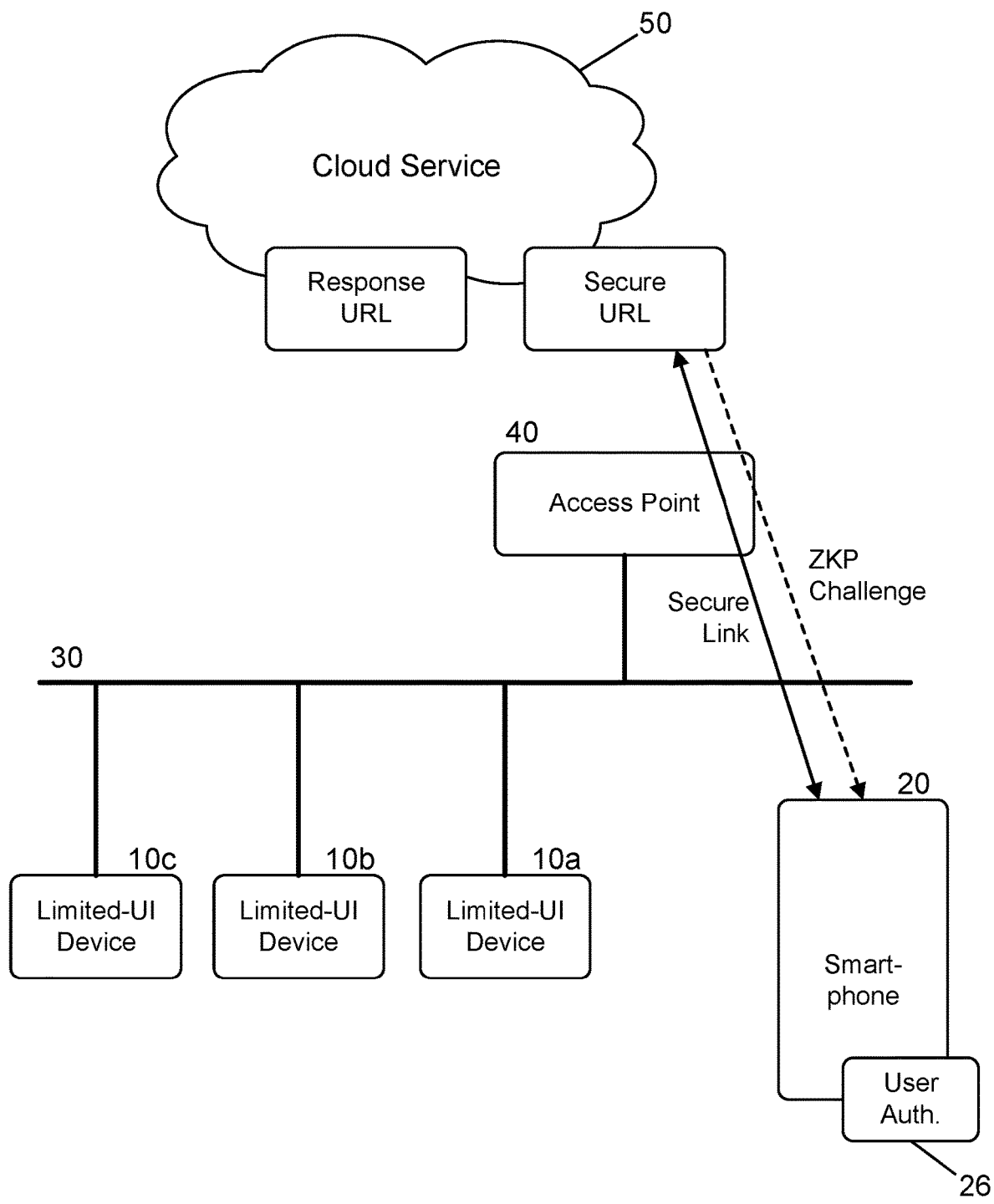

After verifying the user and keychain, the cloud service 50 provides the smartphone 20 with a zero-knowledge protocol (ZKP) challenge, FIG. 2(b). This first ZKP challenge is based on the device ID provided previously. While this is not a true private key, it is only used in this initial stage to establish a more secure peer-to-peer connection.

For details of ZKP challenge/response protocols see, for example, Grzonkowski, Slawomir, et al. "Extending web applications with a lightweight zero knowledge proof authentication." Proceedings of the 5th international conference on Soft computing as transdisciplinary science and technology. ACM, 2008. [Available online at: http://www.cs.nyu.edu/~zaremba/docs/zkp.pdf]

Note that employing such a protocol ensures that local credentials need not be provided by the device 20 to the cloud service 50—it is just sufficient that the device 20 establish that it possesses the required credentials to access the network service 50 via the local network 30 and so allow the IoT device 10a to subsequently access the local network 30 in order that it access the cloud service 50.

Figure 2C:
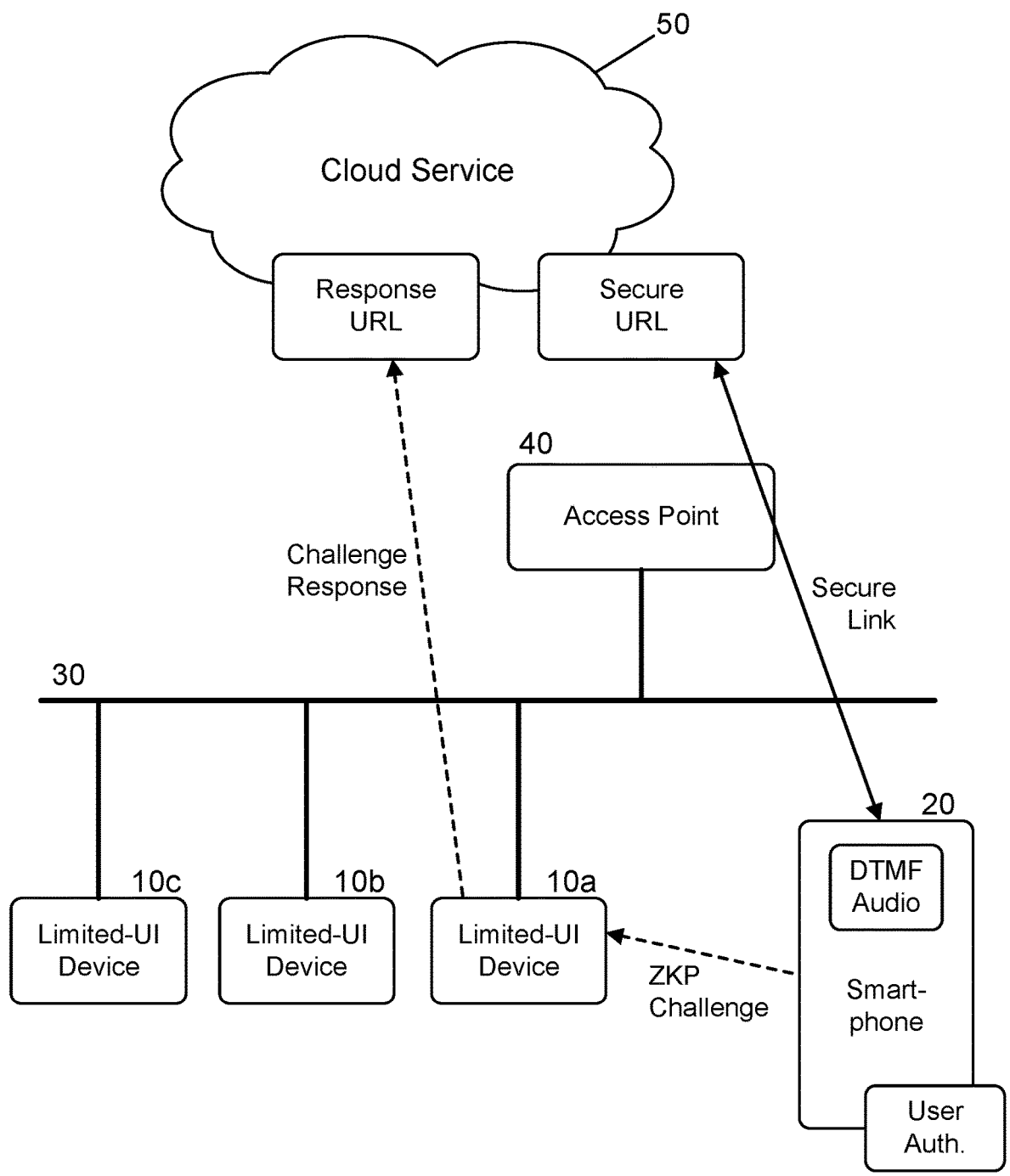

The third stage of the process requires that the smartphone 20 communicate with the limited-UI device 10a, FIG. 2(c). As the limited-UI device 10a is not yet connected to the local network 30, the smartphone 20 must provide it with configuration information as well as the ZKP challenge. Note that the smartphone 20 itself does not have knowledge of how to generate a challenge response—this is embedded within the firmware of the limited-UI device 10a.

In one embodiment, this communication is again out-of-band, although not necessarily using the same channel as for acquiring the device ID originally, in order to keep the limited-UI device 10a secure. Thus, of the modes of communication previously described in relation to FIG. 2(a), the preferred modes for providing the configuration information and ZKP challenge to the limited-UI device 10a are for the smartphone 20 to generate a coded or modulated audio signal, if the limited-UI device 10a is responsive to audio, or a code or modulated light signal, if the limited-UI device 10a has light-sensing capabilities, or NFC pulses if the device 10a provides an NFC sensing capability. Other communications, such as Bluetooth, may be used depending on the level of security required.

Note that, as a typical use case is within a user's home, and as the home environment is considered to be private, it is not likely that local visual or audio signal would be intercepted. Thus, these relatively insecure communications modes can, in fact, provide better security within the home environment than a local network connection which may expose communications packets to a compromised network device or home access point.

The configuration information provided by the smartphone 20, which is already connected to the local network 30, to the limited-UI device 10a comprises a SSID (service set identifier) and password for the local network 30. The limited-UI device 10a can then proceed to configure itself so that it may connect to Internet using the AP 40 as a gateway. The smartphone 20 also provides the first ZKP challenge to the device 10a as well as a response URL.

At this point the limited-UI device 10a is TCP/IP connected but is not yet configured for its underlying services.

At the same time as it is connecting to the local network 30, the limited-UI device 10a processes the ZKP challenge and generates a response. As soon as it is connected to the local network 30, it searches for the response URL and transmits the response to the ZKP challenge. If the response is correct, the cloud service 50, may optionally generate additional challenges and the limited-UI device 10b may generate responses to these. These additional challenges essentially involve a repetition of the steps of FIG. 2(c) and are not shown separately.

In one embodiment, a first additional challenge will be generated within a certain timeframe of the initial response to confirm the link between cloud service 50 and the limited-UI device 10a. If this challenge is not generated then the device 10a will time-out and signal to the user (by blinking a LED or sending a message to the smartphone application software) that the connection was not correctly established. Additional error messages may be provided to the smartphone application software.

Figure 2D:
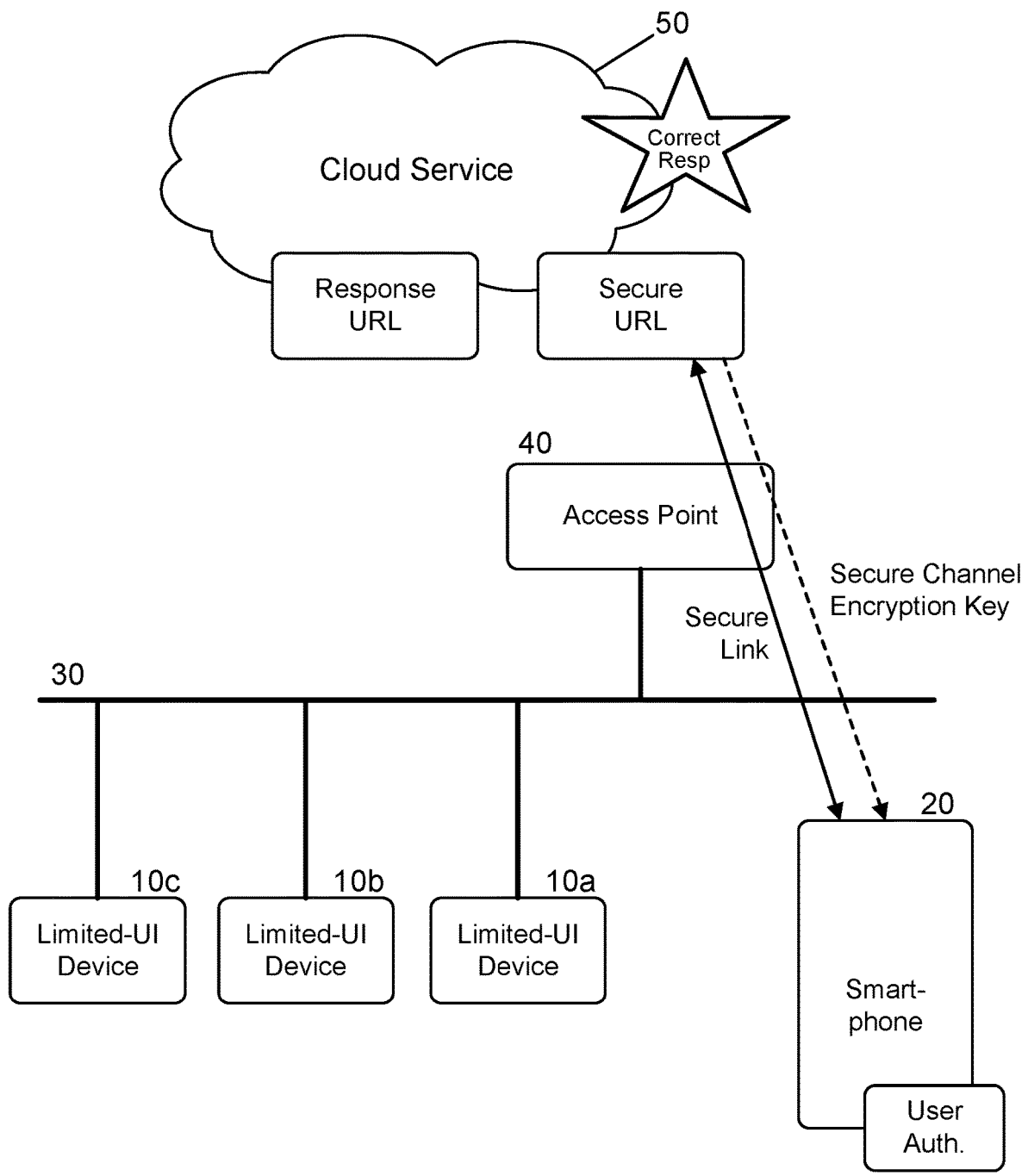
Figure 2E:
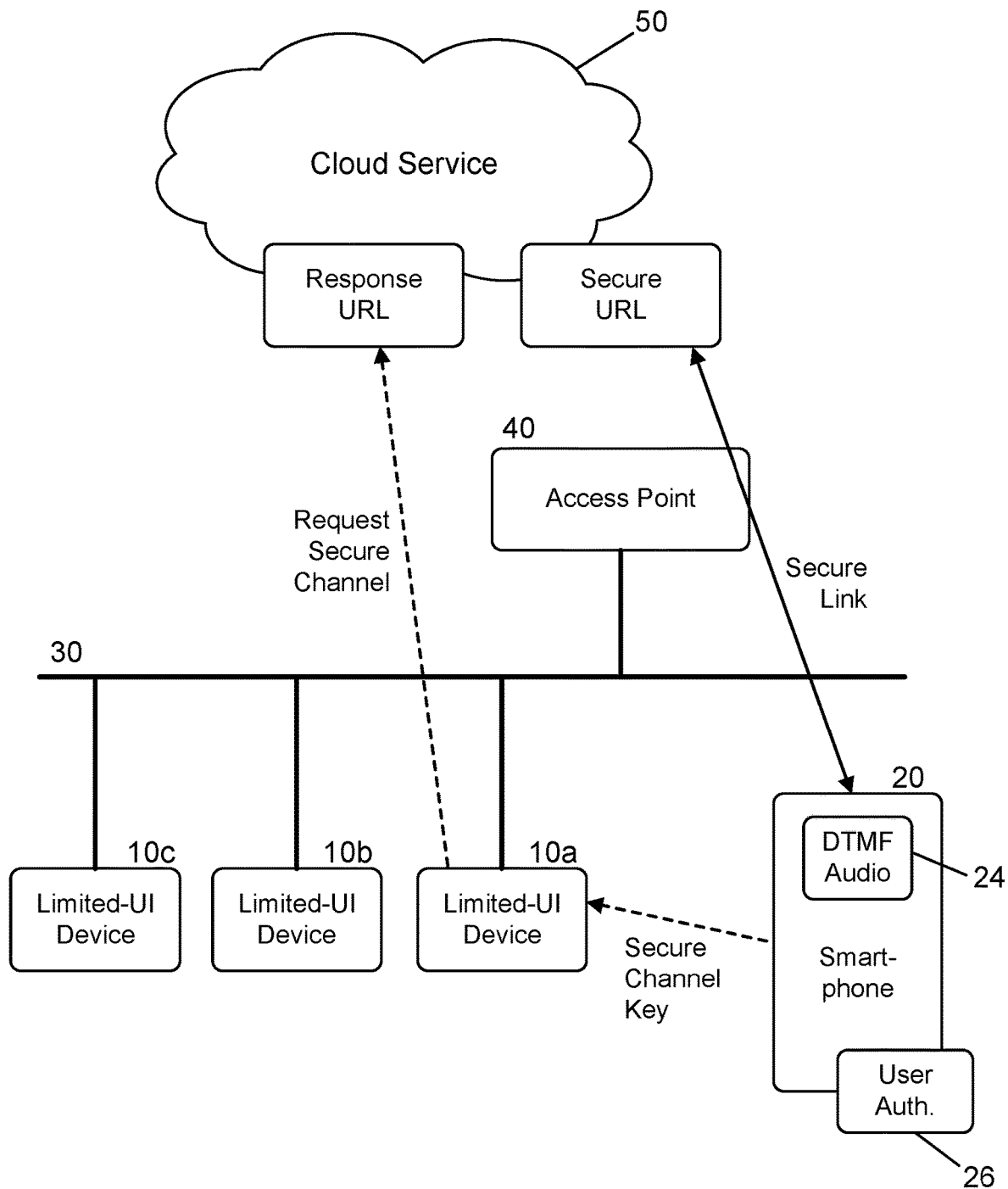

Referring to FIG. 2(d), after the cloud service 50 determines the device 10a is valid, it next generates a secure channel key and transmits this to the smartphone 20 which then transmits the key to the limited-UI device 10a, FIG. 2(e). Note than in a conventional secure link, this key exchange would be performed directly between the cloud service 50 and the limited-UI device 10a, but this can expose the link to various attack modalities such as man-in-themiddle. Furthermore, as limited-UI devices will have less computational power than, for example, a smartphone 20, they will be slower to respond, thus giving an attacker more time to break the encryption. Transmitting the secure channel key via the smartphone ensures the network transport is over an existing secure channel. This is at the risk of using a relatively unsecured communication between the smartphone 20 and the limited-UI device 10a to transmit the key, however as this communication is within the consumer's home, the limited risk is considered acceptable.

The limited-UI device 10a, may then request and establish a secure channel with the cloud service 50.

Figure 2F:
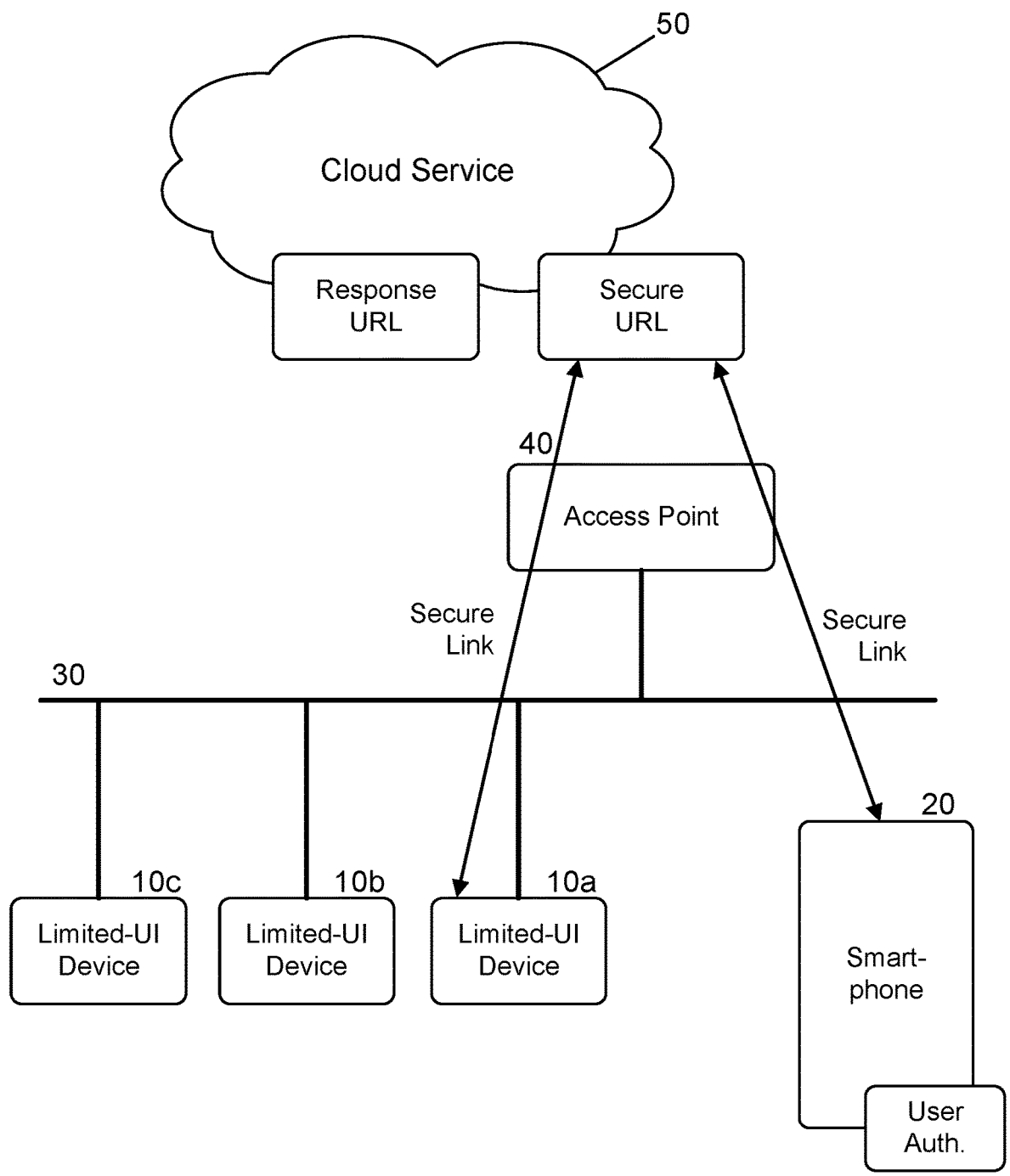

Referring to FIG. 2(f), after the secure channel is established the cloud service 50 can provide additional configuration information to the limited-UI device 10a through the secure link between the cloud service 50 and the limited-UI device 10a.

In one embodiment, the cloud service 50 can also generate configuration panel information (not shown) for the smartphone application software, again provided through the first secure link between the cloud service 50 and the smartphone 20, and enables the smartphone 20 to securely configure the limited-UI device 10a without allowing other local devices to eavesdrop. Thus the effective communication between smartphone and the limited-UI device is now via the cloud service, rather than over the local network.

In alternative embodiments the limited-UI device can be linked with a plurality of other devices through the cloud service (rather than directly over the local network) to form a secure communications group and employ techniques as described in WO 2014/131038 with the additional benefits of device security. Multiple devices may be controlled from the smartphone employing techniques as described in WO 2014/131035 with the additional benefit of device security. Similarly these devices may engage in context aware action and collaborative intelligence coordinated from the cloud service employing techniques as described in WO 2014/131029 and WO 2014/131015 with the added benefit of robust device security.

The cloud service can periodically broadcast ZKP challenges to devices to ensure they are still active on the network and are able to authenticate themselves by answering challenges. The use of such a ZKP proof authentication in combination with conventional SSH (Secure Shell) communications channels, or equivalent, can provide greatly improved security for Internet-of-Things home systems.

What is claimed is:

1. An Internet-of-Things (IoT) device comprising:
   one or more processors; and
   one or more non-transitory computer-readable media storing computer-executable instructions that, when executed, cause the one or more processors to perform operations comprising:
      receiving, by the IoT device, a challenge from a separate configuration device, over a first network path, wherein the challenge is associated with a network service;
      determining, by the IoT device, a challenge response associated with the challenge;
      transmitting, by the IoT device, the challenge response directly to the network service, over a second network path that excludes the configuration device;
      receiving, by the IoT device, a key from the configuration device, over the first network path;
      establishing, by the IoT device, a secure link with the network service, using the key; and
      transmitting, by the IoT device, data to the network service via the secure link.

2. The IoT device of claim 1, the operations further comprising:
   receiving, from the configuration device, a uniform resource locator (URL) associated with the network service, wherein transmitting the challenge response includes transmitting the challenge response to the URL.

3. The IoT device of claim 1, wherein determining the challenge response comprises generating the challenge response based at least in part on data embedded within the firmware of the IoT device.

4. The IoT device of claim 1, the operations further comprising:
   receiving, from the configuration device, credential data associated with a local network, wherein transmitting the challenge response includes using the credential data to transmit the challenge response to the network service via the local network.

5. The IoT device of claim 1, wherein the challenge is received from the configuration device via an out-of-band channel.

6. The IoT device of claim 5, wherein transmitting the challenge response from the IoT device to the network service includes transmitting the challenge response via a computer network.

7. The IoT device of claim 1, the operations further comprising:
   providing a device identifier to the configuration device, via an out-of-band channel, wherein the device identifier is provided to configuration device prior to receiving the challenge from the configuration device.

8. The IoT device of claim 1, the operations further comprising:
   receiving a second challenge associated with the network service from the configuration device, wherein receiving the second challenge is based at least in part on transmitting a correct challenge response from the IoT device to the network service;
   determining a timeframe associated with receiving the second challenge, based at least in part on a time associated with transmitting the challenge response from the IoT device to the network service; and
   transmitting a second challenge response to the network service, based at least in part on determining that the second challenge was received within the timeframe.

9. The IoT device of claim 1, the operations further comprising:
   receiving a second challenge associated with the network service from the configuration device;
   determining a timeframe associated with receiving the second challenge, based at least in part on a time associated with transmitting the challenge response from the IoT device to the network service; and
   initiating a time-out notification based at least in part on determining that the second challenge was received after the timeframe.

10. One or more non-transitory computer-readable media storing instructions executable by a processor, wherein the instructions, when executed, cause the processor to perform operations comprising:
   receiving, by a configuration device, a device identifier from an electronic device;
   transmitting the device identifier from the configuration device to a network service, via a computer network;

receiving, by the configuration device, a challenge from the network service, via the computer network;

providing, by the configuration device, the challenge to the electronic device, via an out-of-band channel;

transmitting, by the electronic device, to the network service, over a second computer network that excludes the configuration device;

receiving, by the configuration device, a key from the network service, via the computer network, wherein the key is associated with establishing a secure link to the network service; and providing, by the configuration device, the key to the electronic device.

11. The one or more non-transitory computer-readable media of claim 10, the operations further comprising:

providing a uniform resource locator (URL) associated with the network service from the configuration device to the electronic device, via the out-of-band channel.

12. The one or more non-transitory computer-readable media of claim 10, the operations further comprising:

providing, by the configuration device, credential data associated with a local computer network to the electronic device, via the out-of-band channel, wherein providing the key to the electronic device comprises transmitting the key from the configuration device via the local computer network.

13. The one or more non-transitory computer-readable media of claim 10:

wherein the device identifier is received by the configuration device from the electronic device via a first out-of-band channel; and wherein the challenge is provided by the configuration device to the electronic device via a second out-of-band channel different from the first out-of-band channel.

14. The one or more non-transitory computer-readable media of claim 10, wherein transmitting the device identifier to the network service comprises:

receiving authentication data from a user via an input interface of the configuration device;

establishing a secure connection from the configuration device to the network service, over the computer network, based at least in part on the authentication data; and transmitting the device identifier via the secure connection.

15. The one or more non-transitory computer-readable media of claim 10, wherein receiving the device identifier from the electronic device comprises detecting a signal emitted from the electronic device using at least one of a camera, a microphone, a near-field communication (NFC) reader, or a radio-frequency ID (RFID) antenna of the configuration device.

16. A method comprising:

receiving, by a server associated with a network service, a device identifier from a first configuration device over a secure network link, wherein the device identifier is associated with a second IoT device;

determining, by the server, a challenge associated with the second IoT device, based at least in part on the device identifier;

transmitting, by the server, the challenge to the first configuration device, over the secure network link;

receiving, by the server, a challenge response directly from the second IoT device over a second network path that excludes the first configuration device;

transmitting, by the server, a key to the first configuration device, based at least in part on the challenge response;

receiving, by the server, a request from the second IoT device to establish a second secure network link, the request including the key; and establishing, by the server, the second secure network link with the second IoT device.

17. The method of claim 16, wherein receiving the challenge response from the second IoT device comprises receiving the challenge response via a non-secure network link.

18. The method of claim 16, wherein the second IoT device comprises a limited user interface (UI) device, lacking at least one of an input interface or a display interface.

19. The method of claim 18, further comprising:

receiving monitoring data from the second IoT device, via the second secure network link; and controlling operations of the second IoT device, via the second secure network link, based at least in part on the monitoring data.

20. The method of claim 16, further comprising:

determining a timeframe associated with transmitting a second challenge; and transmitting the second challenge to the first configuration device within the timeframe, based at least in part on verifying that the challenge response received from the second IoT device is a correct response.

* * * * *